United States Patent
Deshpande et al.

(10) Patent No.: US 10,353,863 B1
(45) Date of Patent: Jul. 16, 2019

(54) UTILIZING MACHINE LEARNING TO DETERMINE DATA STORAGE PRUNING PARAMETERS

(71) Applicant: Capital One Services, LLC, McLean, VA (US)

(72) Inventors: Amit Deshpande, McKinney, TX (US); Ponnazhakan Subramanian, McKinney, TX (US); Satish Chikkaveerappa, McKinney, TX (US); Asutosh Pandya, McKinney, TX (US); Mithra Kosur Venuraju, Frisco, TX (US); Sahul Mohammed, Frisco, TX (US)

(73) Assignee: Capital One Services, LLC, McLean, VA (US)

( * ) Notice: Subject to any disclaimer, the term of this patent is extended or adjusted under 35 U.S.C. 154(b) by 0 days.

(21) Appl. No.: 15/950,482

(22) Filed: Apr. 11, 2018

(51) Int. Cl.
*G06F 16/11* (2019.01)
*G06F 16/28* (2019.01)

(52) U.S. Cl.
CPC .......... *G06F 16/113* (2019.01); *G06F 16/125* (2019.01); *G06F 16/284* (2019.01)

(58) Field of Classification Search
CPC ...... G06F 16/11; G06F 16/113; G06F 16/119; G06F 16/122; G06F 16/125; G06F 16/128
See application file for complete search history.

(56) References Cited

U.S. PATENT DOCUMENTS

| | | | |
|---|---|---|---|
| 5,764,972 A * | 6/1998 | Crouse | G06F 16/113 |
| 6,883,170 B1 | 4/2005 | Garcia | |
| 6,988,069 B2 | 1/2006 | Phillips | |
| 7,705,723 B2 | 4/2010 | Kahn et al. | |
| 7,814,062 B2 * | 10/2010 | Blumenau | G06F 21/10 |
| | | | 707/663 |
| 2006/0253429 A1 | 11/2006 | Raghavan et al. | |
| 2014/0179272 A1 * | 6/2014 | Zhang | H04W 4/001 |
| | | | 455/411 |
| 2014/0233923 A1 * | 8/2014 | Bradley | H04N 21/25891 |
| | | | 386/298 |
| 2017/0324813 A1 * | 11/2017 | Jain | H04L 41/5009 |

* cited by examiner

*Primary Examiner* — Amanda L Willis
(74) *Attorney, Agent, or Firm* — Harrity & Harrity, LLP

(57) ABSTRACT

A device receives, from a user device, a request to prune a primary database, and receives primary database information associated with the primary database and secondary database information associated with a secondary database that is different than the primary database. The device processes the primary database information and the secondary database information, with a machine learning model, to generate suggested pruning parameters, and provides the suggested pruning parameters to the user device. The device receives selected pruning parameters from the user device, where the selected pruning parameters are selected from the suggested pruning parameters or are input via the user device. The device removes pruned information from the primary database based on the selected pruning parameters, and provides the pruned information to the secondary database based on the selected pruning parameters.

20 Claims, 10 Drawing Sheets

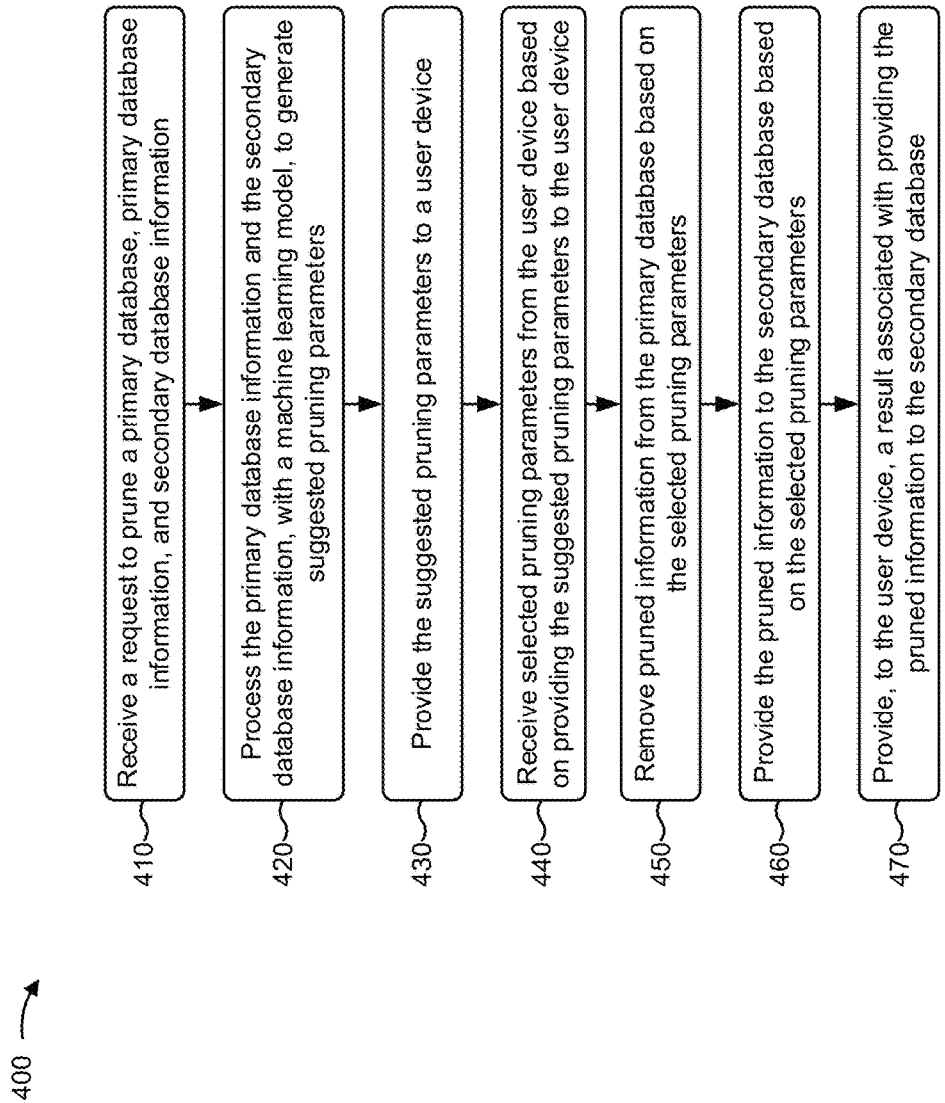

UTILIZING MACHINE LEARNING TO DETERMINE DATA STORAGE PRUNING PARAMETERS

BACKGROUND

Data storage, such as a database, a table, a linked list, and/or the like, is an organized collection of data. A relational database is a collection of schemas, tables, queries, reports, views, and/or the like. Data storage designers typically organize the data storage to model aspects of reality in a way that supports processes requiring information. A data storage management system is a software application that interacts with users, other applications, and data storage to allow definition, creation, querying, update, and/or administration of data storage.

SUMMARY

According to some implementations, a device may include one or more memories, and one or more processors, communicatively coupled to the one or more memories, to receive, from a user device, a request to prune a primary database, and receive primary database information associated with the primary database. The one or more processors may receive secondary database information associated with a secondary database that is different than the primary database, and may process the primary database information and the secondary database information, with a machine learning model, to generate suggested pruning parameters. The one or more processors may provide the suggested pruning parameters to the user device, and may receive selected pruning parameters from the user device, where the selected pruning parameters may be selected from the suggested pruning parameters or may be input via the user device. The one or more processors may remove pruned information from the primary database based on the selected pruning parameters, and may provide the pruned information to the secondary database based on the selected pruning parameters.

According to some implementations, a non-transitory computer-readable medium may store instructions that include one or more instructions that, when executed by one or more processors, cause the one or more processors to receive, from a user device, a request to prune a primary database, and receive primary database information associated with the primary database. The one or more instructions may cause the one or more processors to perform an analysis of a plurality of secondary databases, and select a secondary database from the plurality of second databases based on the analysis of the plurality of secondary databases. The one or more instructions may cause the one or more processors to receive secondary database information associated with the secondary database, and process the primary database information and the secondary database information, with a model, to generate pruning parameters. The one or more instructions may cause the one or more processors to automatically implement the pruning parameters, and remove pruned information from the primary database based on automatically implementing the pruning parameters. The one or more instructions may cause the one or more processors to provide the pruned information to the secondary database based on automatically implementing the pruning parameters.

According to some implementations, a method may include receiving, by a device and from a user device, a request to prune a primary database, and receiving, by the device, primary database information associated with the primary database. The method may include performing, by the device, an analysis of a plurality of secondary databases, and selecting, by the device, a secondary database from the plurality of second databases based on the analysis of the plurality of secondary databases. The method may include receiving, by the device, secondary database information associated with the secondary database, and processing, by the device, the primary database information and the secondary database information, with a model, to generate suggested pruning parameters. The method may include providing, by the device, the suggested pruning parameters to the user device, and receiving, by the device, selected pruning parameters from the user device, where the selected pruning parameters may be selected from the suggested pruning parameters or may be input via the user device. The method may include removing, by the device, pruned information from the primary database based on the selected pruning parameters, and providing, by the device, the pruned information to the secondary database based on the selected pruning parameters.

BRIEF DESCRIPTION OF THE DRAWINGS

FIG. 4 is a flow chart of an example process for utilizing machine learning to determine data storage pruning parameters.

DETAILED DESCRIPTION

The following detailed description of example implementations refers to the accompanying drawings. The same reference numbers in different drawings may identify the same or similar elements.

A data pruning strategy may be utilized to prune or remove information from data storage and reduce a size of the data storage. However, large entities (e.g., companies, organizations, government agencies, and/or the like) utilize a variety of data storage, and typically do not utilize data pruning strategies, or utilize different and inconsistent data pruning strategies, for the variety of data storage. This results in storing information in data storage that is not utilized, requesting more data storage to store new information when older information is not utilized, and/or the like, which unnecessarily increases data storage costs for the large entities.

Some implementations described herein provide a data pruner platform that utilizes machine learning to determine data storage pruning parameters. For example, the data pruner platform may receive a request to prune a primary database, primary database information associated with the primary database, and secondary database information associated with a secondary database that is different than the primary database. The data pruner platform may process the primary database information and the secondary database information, with a machine learning model, to generate suggested pruning parameters. The data pruner platform may provide the suggested pruning parameters to a user device, and may receive selected pruning parameters from the user device. The data pruner platform may remove pruned information from the primary database based on the selected pruning parameters, and may provide the pruned information to the secondary database based on the selected pruning parameters.

Although implementations are described with respect to databases, the implementations, may be utilized with any type of data storage, such as any type of database (e.g., a relational database, a cloud database, a centralized database, a distributed database, and/or the like), cloud storage, network file storage, table, linked list, and/or the like.

Figure 1A:
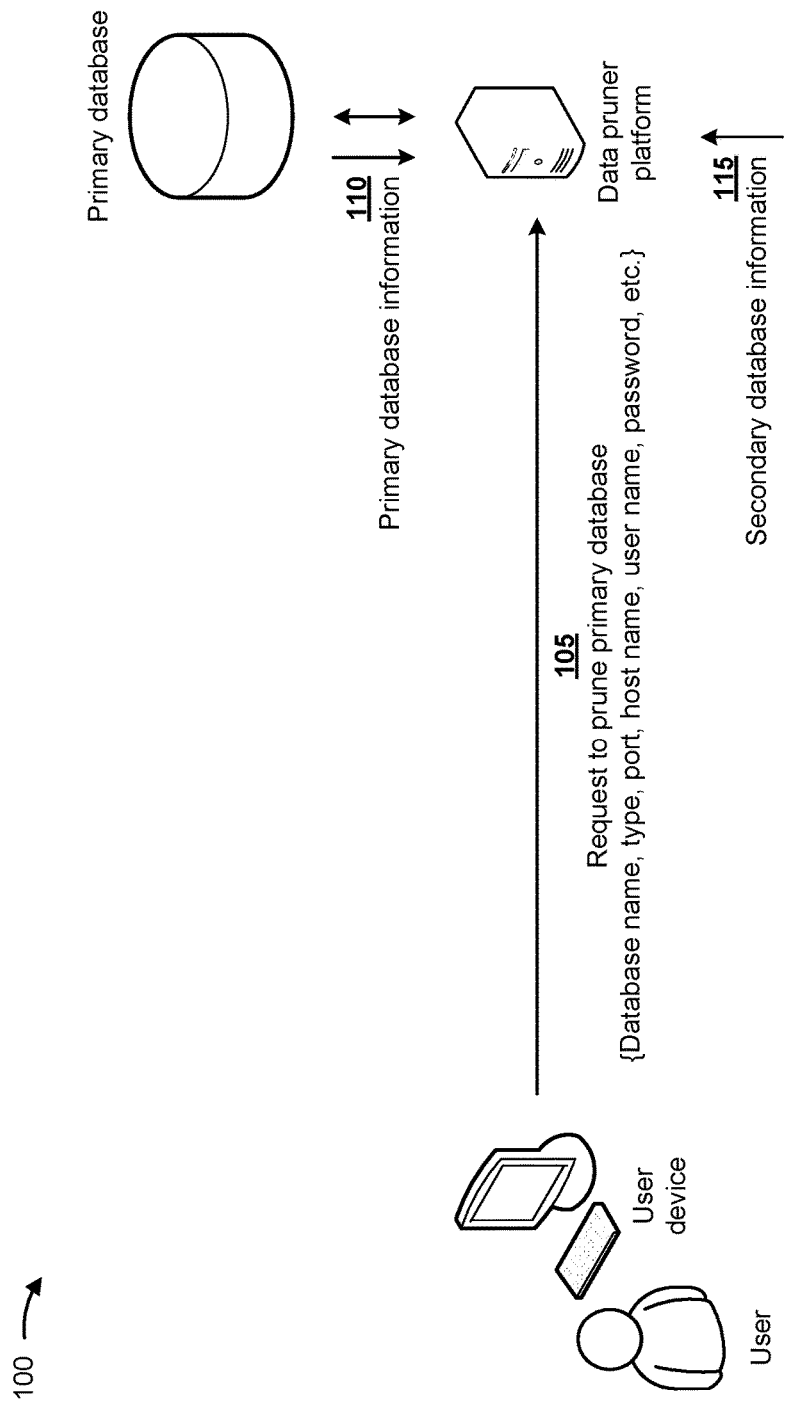
FIGS. 1A-1G are diagrams of an overview of an example implementation described herein.

FIGS. 1A-1G are diagrams of an overview of an example implementation 100 described herein. As shown in FIG. 1A, a user device may be associated with a user, a data pruner platform, and a primary database. As further shown in FIG. 1A, and by reference number 105, assume that the user utilizes the user device to generate a request to prune the primary database. The user device may provide the request to the data pruner platform, and the data pruner platform may receive the request. In some implementations, the request to prune the primary database may include information identifying a database name, a type (e.g., a relational database, a distributed database, and/or the like), a port (e.g., an identifier of a port associated with the database), a host name (e.g., a name of a server, a virtual machine, and/or the like), credentials (e.g., a user name, a password, and/or the like), a schema (e.g., a structure of a database described in a formal language, an organization of data indicating how a database is constructed, and/or the like), and/or the like associated with the primary database. For example, if the primary database stores employee information, the request may include information identifying a name (e.g., "Employee"), a type (e.g., "Postgres"), a port (e.g., "5432"), a host name (e.g., "http://myhost.com/temp"), a user name (e.g., "testuser"), a password (e.g., "xyz123"), and a schema (e.g., "testschema") associated with the primary database.

As further shown in FIG. 1A, and by reference number 110, the data pruner device may receive primary database information from the primary database. In some implementations, the primary database information may include information indicating a size of the primary database, fields of the primary database, a quantity of columns in the primary database, a quantity of rows in the primary database, costs associated with the primary database, and/or the like.

As further shown in FIG. 1A, and by reference number 115, the data pruner device may receive secondary database information associated with one or more secondary databases (not shown). In some implementations, the one or more secondary databases may include databases that receive and store information pruned from the primary database, as described elsewhere herein. In some implementations, the second database information may include information indicating sizes of the one or more secondary databases, fields of the one or more secondary databases, quantities of columns in the one or more secondary databases, quantities of rows in the one or more secondary databases, costs associated with the one or more secondary databases, and/or the like.

Figure 1B:
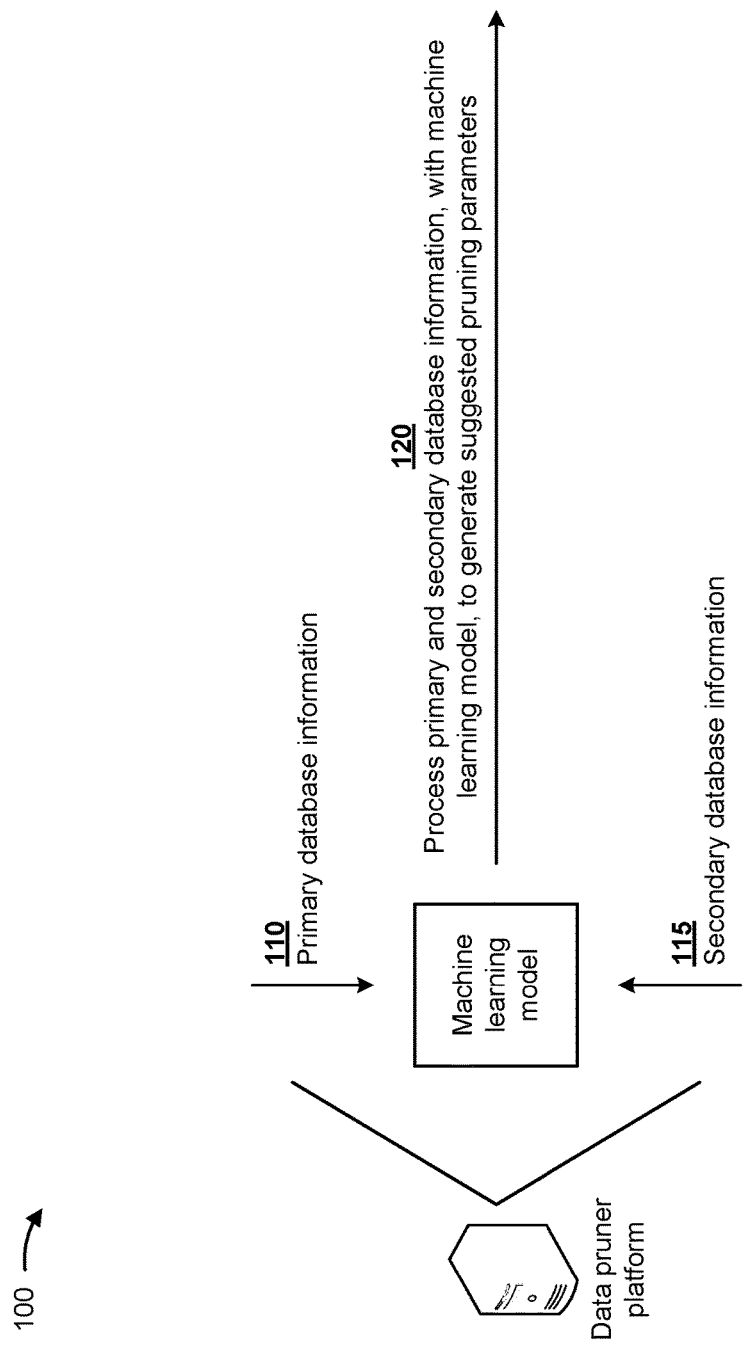

As shown in FIG. 1B, and by reference numbers 110, 115, and 120, the data pruner platform may process the primary database information and the secondary database information, with a machine learning model, to generate suggested pruning parameters for the primary database. In some implementations, the suggested pruning parameters may include one or more of a parameter indicating a frequency to prune the primary database (e.g., one time, daily, weekly, monthly, etc.), a parameter identifying information to be pruned from the primary database (e.g., information associated with particular columns, rows, etc.), a parameter indicating a time or date range associated with information to be pruned from the primary database, a parameter identifying one or more second databases to which the pruned information is provided and stored, a parameter indicating that particular data (e.g., columns and/or rows) of the primary database, that has not be accessed (e.g., for a particular time period), is to be pruned, a parameter indicating that information containing errors, in the primary database, is to be pruned, a parameter indicating that anomalous information in the primary database is to be pruned, parameter indicating that personal information in the primary database is to be pruned, and/or the like.

In some implementations, the primary database may include millions, trillions, billions, etc. of data entries, columns, and/or rows, and thus may present a big data problem. In some implementations, the pruning parameters may indicate to completely remove one or more columns, cut one or more columns to a certain number of entries, cut another one or more columns to a different number of entries (e.g., every column may be trimmed to a different number of entries), and/or the like. In some implementations, the pruning parameters may indicate to trim the primary database based on a date of entries (e.g., only keep entries that are newer than one day, one week, one month, one year, and/or the like). In some implementations, the pruning parameters may indicate that different columns could have data with a different cutoff date for trimming (e.g., some columns with data for one month, some columns with data for one year, some columns with data for three years, etc.). In some implementations, the pruning parameters may indicate that pruning is to be based on a type of data in each column, or a value of the data in each column, and/or the like. In this way, the data pruner platform may manage a complex, big data problem quickly and efficiently.

In some implementations, the machine learning model may include one or more of an exploratory factor analysis model, a confirmatory factor analysis model, a principal component analysis model, a k-means clustering model, a least absolute shrinkage and selection operator (Lasso) regression analysis model, and/or the like.

The exploratory factor analysis model may include a statistical model used to uncover an underlying structure of a relatively large set of variables. For example, the exploratory factor analysis model may perform a factor analysis technique with an objective to identify an underlying relationships between measured variables. Measured variables may include any one of several attributes of a subject (e.g., a physical height of a human being) that may be observed and measured. The exploratory factor analysis model is based on a common factor model, within which a function of common factors, unique factors, and errors of measurements expresses measured variables. Common factors influence two or more measured variables, while each unique factor influences one measured variable and does not explain correlations among measured variables.

The confirmatory factor analysis model may include a form of factor analysis that is used to test whether measures of a construct are consistent with a preliminary conception of a nature of the construct. As such, an objective of the confirmatory factor analysis model is to test whether data fits a hypothesized measurement model that is based on theory and/or previous analytic research.

The principal component analysis model may include a statistical procedure that uses an orthogonal transformation to convert a set of observations of possibly correlated variables into a set of values of linearly uncorrelated variables called principal components. A number of distinct principal components is equal to a smaller of a number of original variables or a number of observations minus one. The orthogonal transformation may defined in such a way that a first principal component has a largest possible variance (e.g., accounts for as much of a variability in data as possible), and each succeeding component in turn has a highest variance possible under a constraint that it is orthogonal to preceding components. Resulting vectors may include an uncorrelated orthogonal basis set.

The k-means clustering model may be applied to partition (n) observations into (k) clusters in which each observation belongs to a cluster with a nearest mean, serving as a prototype of the cluster, which results in a partitioning of a data space into Voronoi cells. In this case, the k-means clustering model may utilize efficient heuristic methods that converge quickly to a local optimum.

The Lasso regression analysis model may include a regression analysis model that performs both variable selection and regularization in order to enhance a prediction accuracy and interpretability of a statistical model that the Lasso regression analysis model produces. For example, the Lasso regression analysis model may include a shrinkage and selection model for linear regression, and may seek to obtain a subset of predictors that minimizes prediction error for a quantitative response variable. In some implementations, the Lasso regression analysis model may minimize the prediction error by imposing a constraint on the model parameters that cause regression coefficients for some variables to shrink toward zero. Variables with a regression coefficient equal to zero after the shrinkage process may be excluded from the model, while variables with non-zero regression coefficient variables are most strongly associated with the quantitative response variable.

In this way, the data pruner platform may utilize one or more machine learning models to generate the suggested pruning parameters. In some implementations, the data pruner platform may select which one or more of the machine learning models to utilize based on the primary database information, the secondary database information, user input, and/or the like. In some implementations, the data pruner platform may utilize multiple machine learning models, may weight results of the multiple machine learning models, and may combine the results to obtain a final result (e.g., the suggested pruning parameters for the primary database).

Figure 1C:
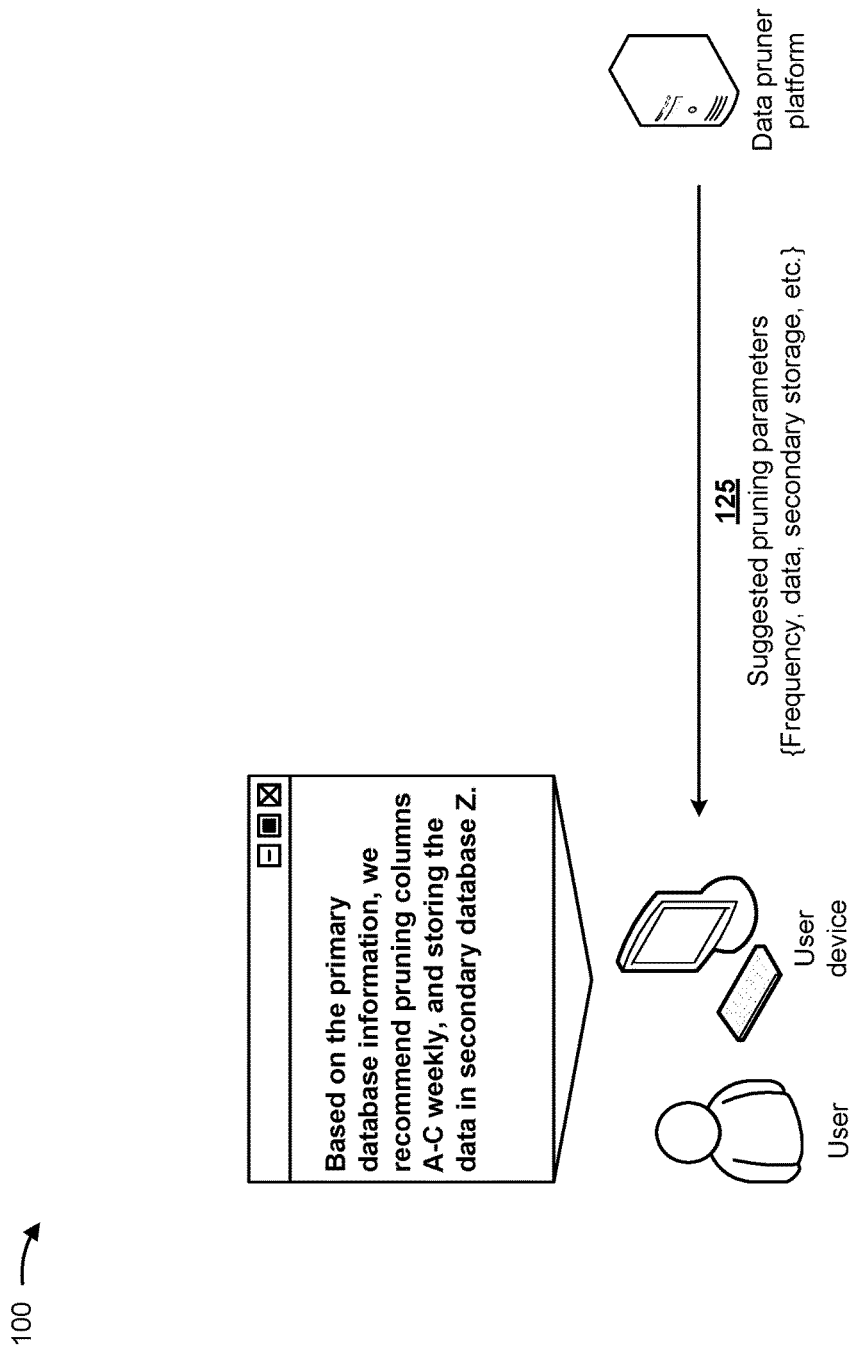

As shown in FIG. 1C, and by reference number 125, the data pruner platform may provide information identifying the suggested pruning parameters to the user device. For example, the suggested pruning parameters may include a parameter indicating that the primary database should be pruned weekly, a parameter indicating that certain columns (e.g., columns A-C) of the primary database should be pruned, and a parameter identifying a second database (e.g., secondary database Z). As further shown, the user device may receive the information identifying the suggested pruning parameters, and may display the information, via a user interface, to the user. For example, the user interface may indicate that "based on the primary database information, we recommend pruning columns A-C weekly, and storing the data in secondary database Z."

In some implementations, the user may select, via the user interface, one or more the suggested pruning parameters, or may not select any of the suggested pruning parameters. In some implementations, the user may provide, via the user interface, one or more user-provided pruning parameters. For example, a suggested pruning parameter may suggest pruning the primary database weekly, but the user may change (e.g., via the user interface) the frequency of the pruning the primary database from weekly to daily, where the change may be referred to as user-provided pruning parameter.

Figure 1D:
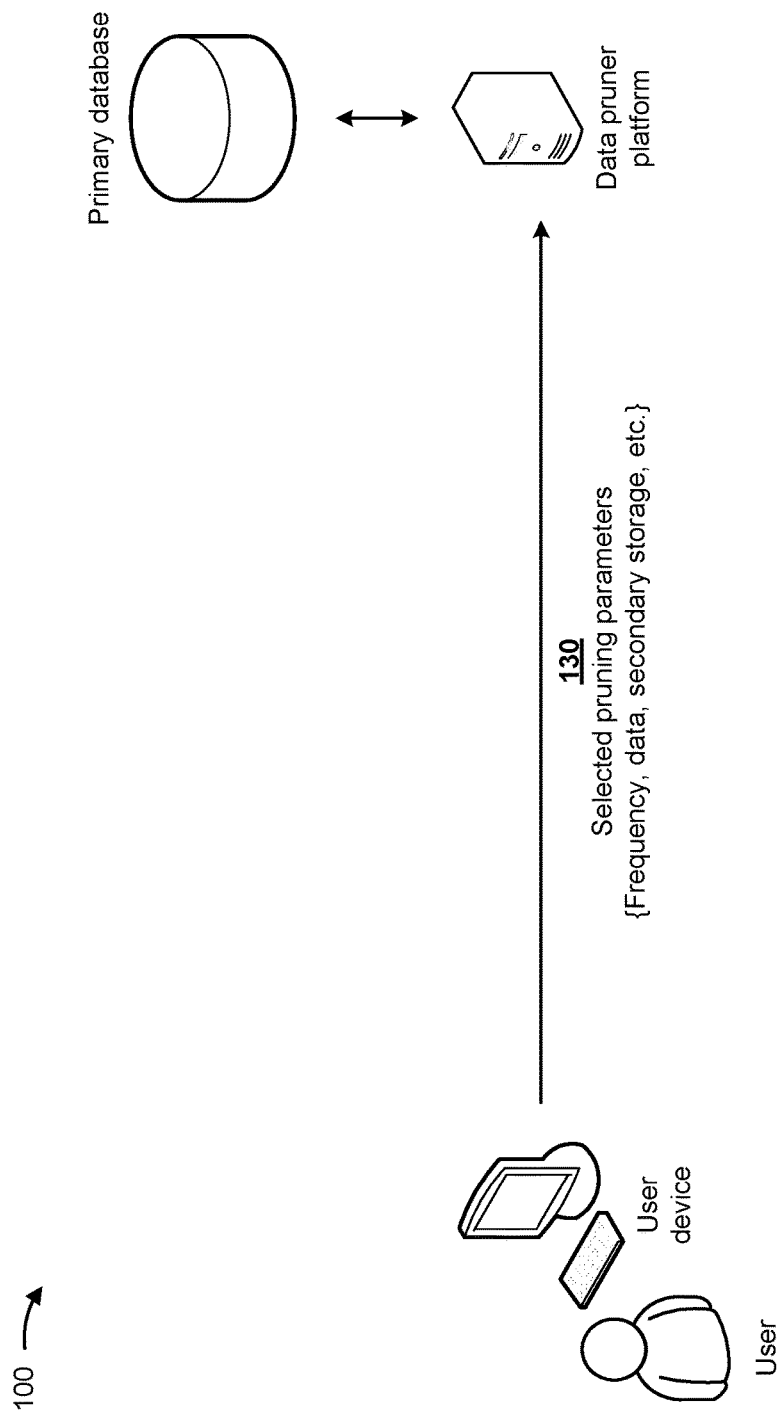

As shown in FIG. 1D, and by reference number 130, the data pruner platform may receive, from the user device, selected pruning parameters. In some implementations, the selected pruning parameters may include the one or more suggested pruning parameters selected by the user. In some implementations, the selected pruning parameters may include one or more user-provided pruning parameters. In some implementations, the selected pruning parameters may include a combination of suggested pruning parameters selected by the user and the user-provided parameters. For example, if the user selects all of the suggested pruning parameters, the selected pruning parameters may include the parameter indicating that the primary database should be pruned weekly (e.g., frequency), the parameter indicating that certain columns (e.g., columns A-C) of the primary database should be pruned, and the parameter identifying a second database (e.g., secondary database Z).

Figure 1E:
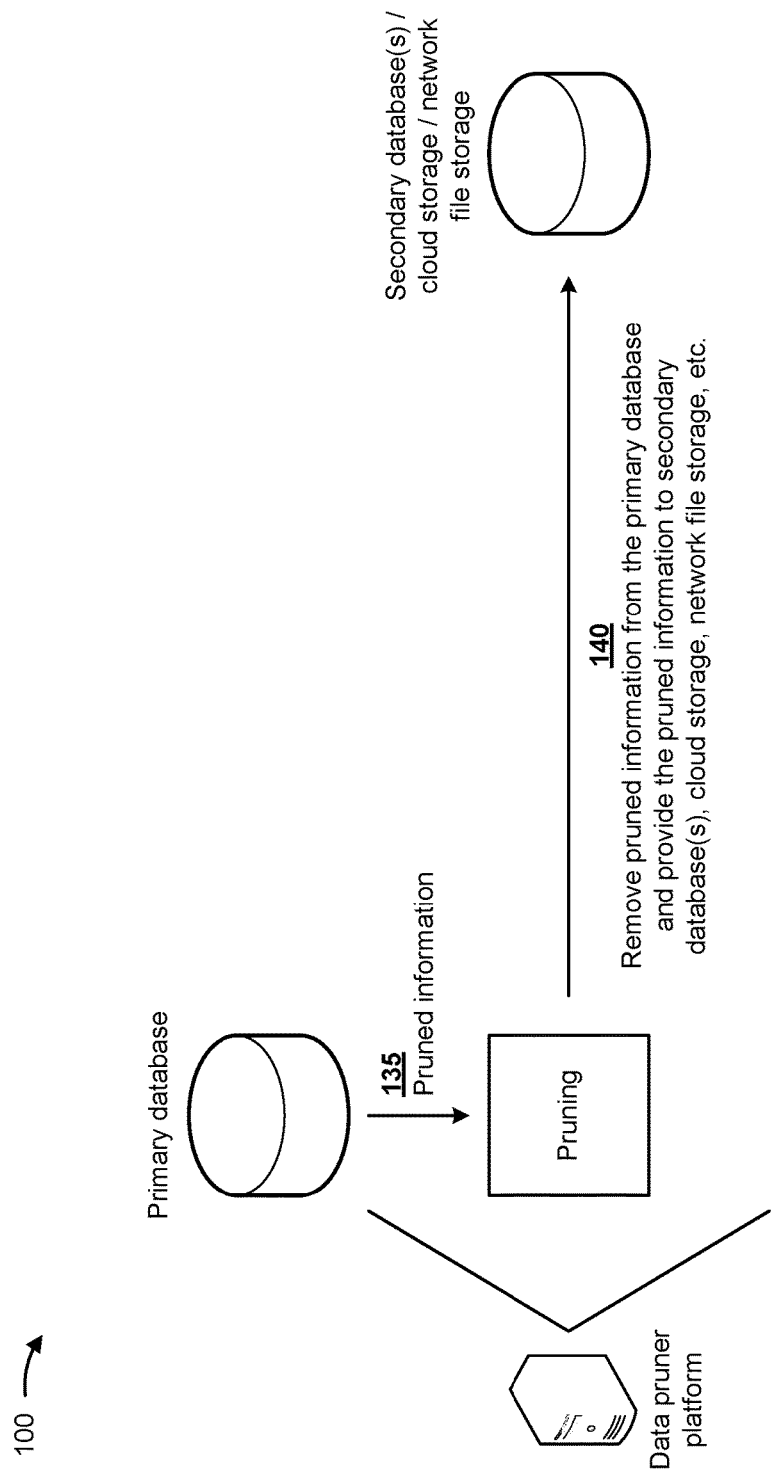

As shown in FIG. 1E, and by reference number 135, the data pruner platform may prune the primary database of pruned information based on the selected pruning parameters. For example, based on the selected pruning parameters, the data pruner platform may remove columns A-C from the primary database on a weekly basis, and the removed columns may constitute the pruned information. As further shown in FIG. 1E, and by reference number 140, the data pruner platform may remove the pruned information from the primary database, and may provide the pruned information to one or more secondary databases, cloud storage, network file storage, and/or the like.

In some implementations, removing the pruned information from the primary database may reduce a size of the primary database. In some implementations, providing the pruned information to the one or more secondary databases, cloud storage, network, file storage, and/or the like may preserve the pruned information in case such information is needed in the future. Furthermore, if utilization of the primary database is more expensive than utilization of, for example, a secondary database, moving the pruned information from the primary database to the second database may reduce costs for an entity associated with the pruned information. In some implementations, the pruned information may be moved from the primary database to a low cost storage facility, which may further reduce costs.

In some implementations, the data pruner platform may continuously receive the primary database information and/or the secondary database information, may periodically receive the primary database information and/or the secondary database information, and/or the like. In such implementations, the data pruner platform may analyze the primary database information and/or the secondary database information, and may determine a backup strategy for the primary database based on the analysis of the primary database information and/or the secondary database information. For example, the data pruner platform may determine, based on analyzing the primary database information, that certain columns of the primary database have not been utilized for over one month. In such an example, the data pruner platform may determine a backup strategy that includes pruning the certain columns from the primary database on a monthly basis. In some implementations, the data pruner platform may automatically (or with approval from the user) implement the backup strategy via the selected pruning parameters and/or via new pruning parameters.

In another example, based on analyzing the primary database information, the data pruner platform may determine that it would be cheaper to move the certain columns from the primary database to cloud storage. Based on this determination, the data pruner may automatically (or with approval from the user) implement a backup strategy that moves the certain columns from the primary database to the cloud storage on a monthly basis.

In some implementations, based on analyzing the primary database information and/or the secondary database information, the data pruner platform may determine one or more errors associated with the primary database and/or the secondary database. For example, the data pruner platform may determine that the primary database and/or the secondary database are at capacity, may determine that the pruned information was not properly moved from the primary database to the secondary database, and/or the like.

Figure 1F:
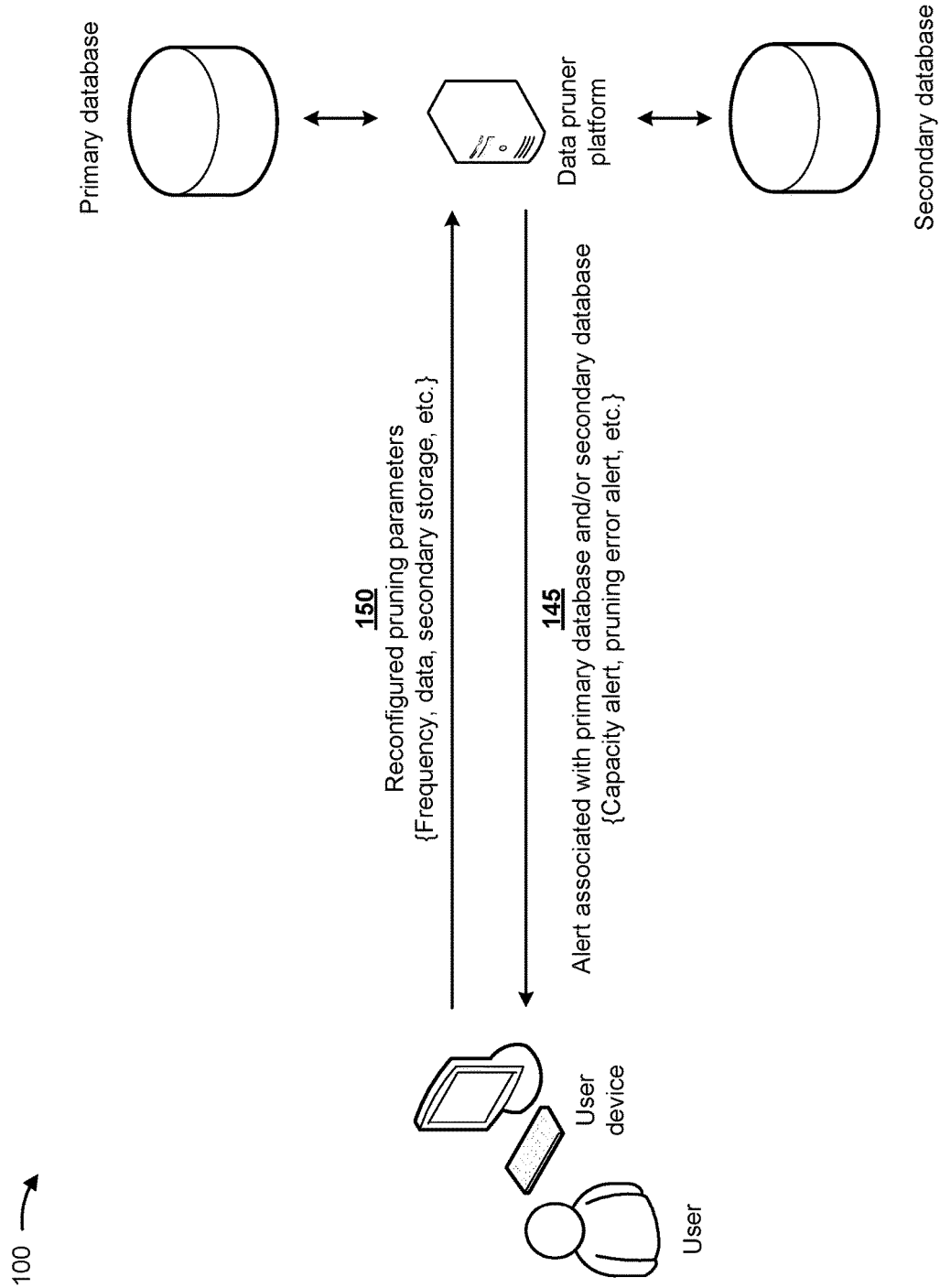

As shown in FIG. 1F, and by reference number 145, when the data pruner platform identifies one or more errors associated with the primary database and/or the secondary database, the data pruner platform may generate and provide an alert, associated with the primary database and/or the secondary database, to the user device. For example, the data pruner platform may generate an alert indicating that the primary database and/or the secondary database are at capacity, an alert indicating that the pruned information was not properly moved from the primary database to the secondary database, and/or the like. The user device may receive the alert associated with the primary database and/or the secondary database, and may provide the alert for display to the user. In some implementations, the user may reconfigure the pruning parameters based on the alert. For example, if the alert indicates that the primary database is at capacity, the user may reconfigure the pruning parameters to remove the pruned information from the primary database more frequently. In some implementations, the data pruner platform may determine that pruned information was removed from the primary database since the information is only accessed once a year (e.g., around tax season). In such implementations, the data pruner platform may move such information back into the primary database prior to a predicted time when the information will be needed (e.g., during tax season).

As further shown in FIG. 1F, and by reference number 150, the user may cause the user device to provide the reconfigured pruning parameters to the data pruner platform, and the data pruner platform may receive the reconfigured pruning parameters. In some implementations, the reconfigured pruning parameters may indicate that the pruned information is to be removed from the primary database more frequently, additional data is to be pruned from the primary database, the additional data is to be provided to another secondary database, and/or the like. In some implementations, the reconfigured pruning parameters may be implemented by the data pruner platform. For example, based on the reconfigured pruning parameters, the data pruner platform may remove the pruned information from the primary database more frequently, may prune the additional data from the primary database, and may provide the additional data to the other secondary database.

Figure 1G:
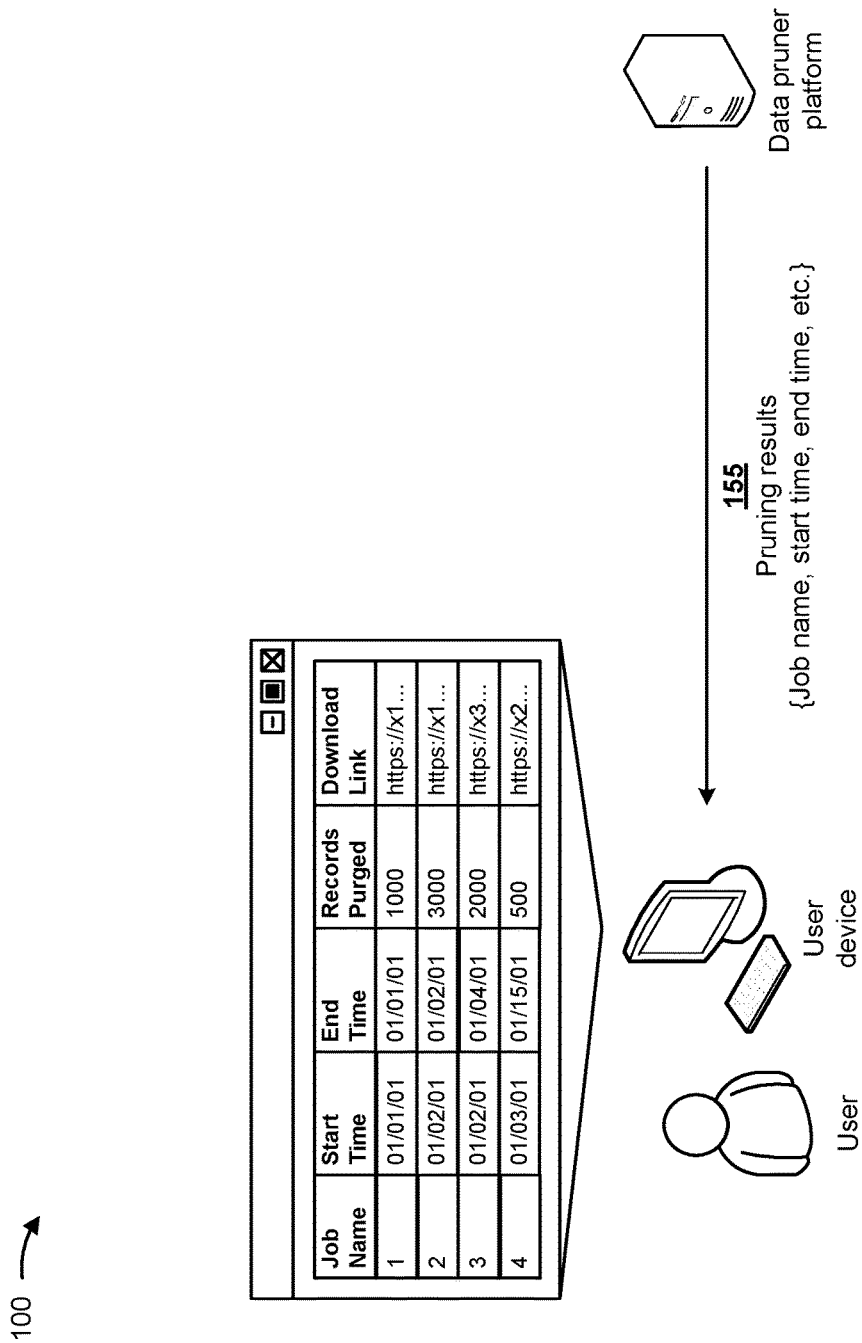

As shown in FIG. 1G, and by reference number 155, the data pruner platform may provide, to the user device, information indicating results of pruning the primary database. In some implementations, the data pruner platform may provide, to the user device, the information indicating the results after the data pruner platform performs the pruning of the primary database, upon request from the user, periodically (e.g., daily, weekly, monthly, etc.), and/or the like. In some implementations, the information indicating the results may include information indicating names associated with pruning jobs performed by the data pruner platform, start times associated with pruning jobs, end times associated with the pruning jobs, a quantity of records purged from the primary database for each of the pruning jobs, uniform resource locators (e.g., URLs or links) identifying the secondary databased to which pruned information is provided, and/or the like.

In some implementations, the user device may display the information indicating the results to the user via a user interface. For example, the user interface may display information indicating that Job 1 was started and completed on "01/01/01," purged "1000" records, and stored the records at "https:/x1;" Job 2 was started and completed on "01/02/01," purged "3000" records, and stored the records at "https:/x1;" Job 3 was started on "01/02/01" and completed on "01/04/01," purged "2000" records, and stored the records at "https:/x3;" and Job 4 was started on "01/03/01" and completed on "01/15/01," purged "500" records, and stored the records at "https:/x2."

In this way, several different stages of the process for utilizing machine learning to determine data storage pruning parameters are automated, which may remove human subjectivity and waste from the process, and which may improve speed and efficiency of the process and conserve computing resources (e.g., processing resources, memory resources, and/or the like). Furthermore, implementations described herein use a rigorous, computerized process to perform tasks or roles that were not previously performed or were previously performed using subjective human intuition or input. For example, currently there does not exist a technique that utilizes machine learning to determine data storage pruning parameters. Finally, automating the process for utilizing machine learning to determine data storage pruning parameters conserves computing resources (e.g., processing resources, memory resources, and/or the like) that would otherwise be wasted in attempting to determine data storage pruning parameters.

As indicated above, FIGS. 1A-1G are provided merely as examples. Other examples are possible and may differ from what was described with regard to FIGS. 1A-1G.

Figure 2:
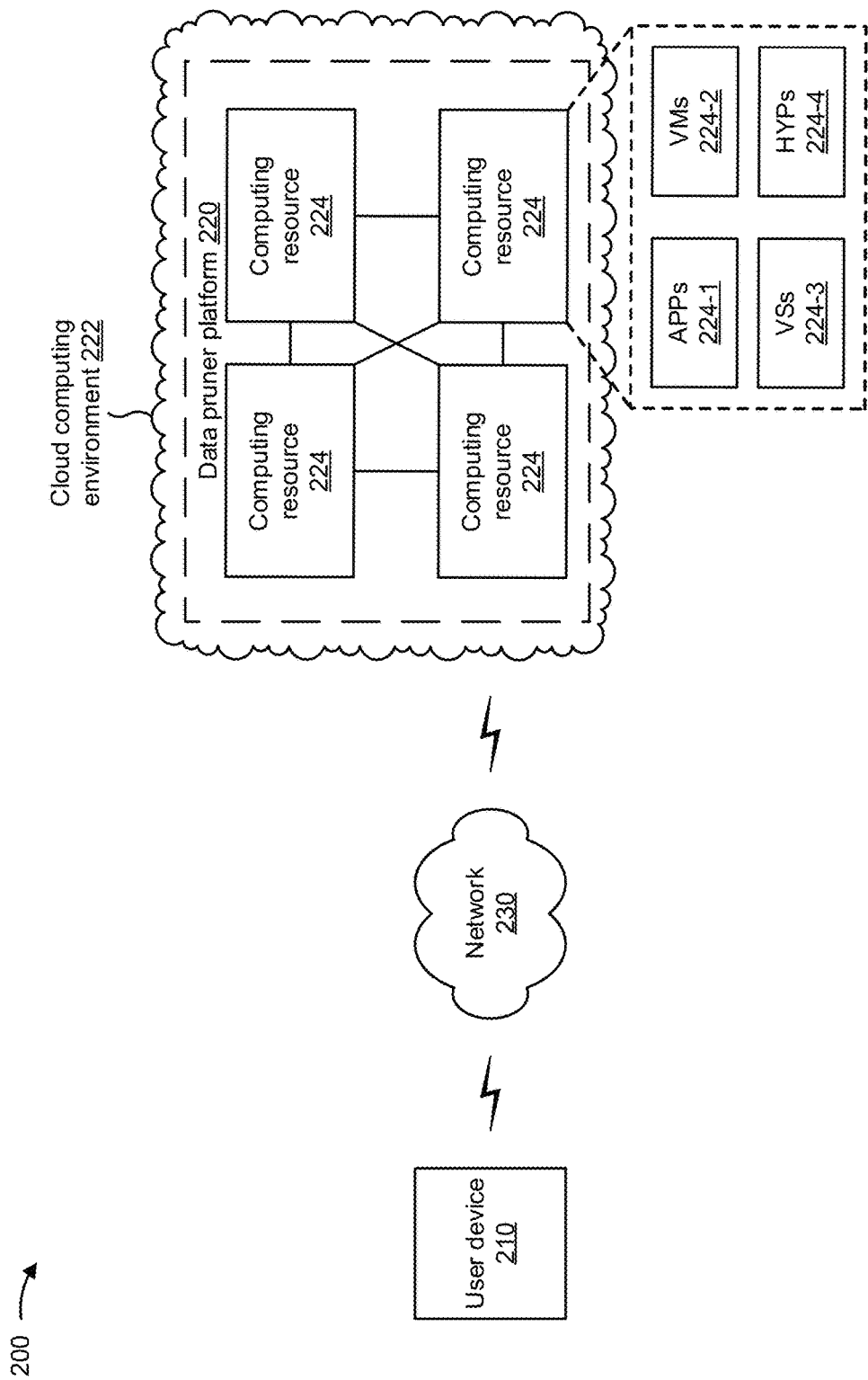
FIG. 2 is a diagram of an example environment in which systems and/or methods, described herein, may be implemented.

FIG. 2 is a diagram of an example environment 200 in which systems and/or methods, described herein, may be implemented. As shown in FIG. 2, environment 200 may include a user device 210, a data pruner platform 220, and a network 230. Devices of environment 200 may interconnect via wired connections, wireless connections, or a combination of wired and wireless connections.

User device 210 includes one or more devices capable of receiving, generating, storing, processing, and/or providing information, such as information described herein. For example, user device 210 may include a mobile phone (e.g., a smart phone, a radiotelephone, etc.), a laptop computer, a tablet computer, a desktop computer, a handheld computer, a gaming device, a wearable communication device (e.g., a smart wristwatch, a pair of smart eyeglasses, etc.), or a similar type of device. In some implementations, user device 210 may receive information from and/or transmit information to data pruner platform 220.

Data pruner platform 220 includes one or more devices that utilize machine learning to determine data storage pruning parameters. In some implementations, data pruner platform 220 may be designed to be modular such that certain software components may be swapped in or out depending on a particular need. As such, data pruner platform 220 may be easily and/or quickly reconfigured for different uses. In some implementations, data pruner platform 220 may receive information from and/or transmit information to one or more user devices 210.

In some implementations, as shown, data pruner platform 220 may be hosted in a cloud computing environment 222. Notably, while implementations described herein describe data pruner platform 220 as being hosted in cloud computing environment 222, in some implementations, data pruner platform 220 may not be cloud-based (i.e., may be implemented outside of a cloud computing environment) or may be partially cloud-based.

Cloud computing environment 222 includes an environment that hosts data pruner platform 220. Cloud computing environment 222 may provide computation, software, data access, storage, etc. services that do not require end-user knowledge of a physical location and configuration of system(s) and/or device(s) that hosts data pruner platform 220. As shown, cloud computing environment 222 may include a group of computing resources 224 (referred to collectively as "computing resources 224" and individually as "computing resource 224").

Computing resource 224 includes one or more personal computers, workstation computers, server devices, or other types of computation and/or communication devices. In some implementations, computing resource 224 may host data pruner platform 220. The cloud resources may include compute instances executing in computing resource 224, storage devices provided in computing resource 224, data transfer devices provided by computing resource 224, etc. In some implementations, computing resource 224 may communicate with other computing resources 224 via wired connections, wireless connections, or a combination of wired and wireless connections.

As further shown in FIG. 2, computing resource 224 includes a group of cloud resources, such as one or more applications ("APPs") 224-1, one or more virtual machines ("VMs") 224-2, virtualized storage ("VSs") 224-3, one or more hypervisors ("HYPs") 224-4, and/or the like.

Application 224-1 includes one or more software applications that may be provided to or accessed by user device 210. Application 224-1 may eliminate a need to install and execute the software applications on user device 210. For example, application 224-1 may include software associated with data pruner platform 220 and/or any other software capable of being provided via cloud computing environment 222. In some implementations, one application 224-1 may send/receive information to/from one or more other applications 224-1, via virtual machine 224-2.

Virtual machine 224-2 includes a software implementation of a machine (e.g., a computer) that executes programs like a physical machine. Virtual machine 224-2 may be either a system virtual machine or a process virtual machine, depending upon use and degree of correspondence to any real machine by virtual machine 224-2. A system virtual machine may provide a complete system platform that supports execution of a complete operating system ("OS"). A process virtual machine may execute a single program, and may support a single process. In some implementations, virtual machine 224-2 may execute on behalf of a user (e.g., a user of user device 210 or an operator of data pruner platform 220), and may manage infrastructure of cloud computing environment 222, such as data management, synchronization, or long-duration data transfers.

Virtualized storage 224-3 includes one or more storage systems and/or one or more devices that use virtualization techniques within the storage systems or devices of computing resource 224. In some implementations, within the context of a storage system, types of virtualizations may include block virtualization and file virtualization. Block virtualization may refer to abstraction (or separation) of logical storage from physical storage so that the storage system may be accessed without regard to physical storage or heterogeneous structure. The separation may permit administrators of the storage system flexibility in how the administrators manage storage for end users. File virtualization may eliminate dependencies between data accessed at a file level and a location where files are physically stored. This may enable optimization of storage use, server consolidation, and/or performance of non-disruptive file migrations.

Hypervisor 224-4 may provide hardware virtualization techniques that allow multiple operating systems (e.g., "guest operating systems") to execute concurrently on a host computer, such as computing resource 224. Hypervisor 224-4 may present a virtual operating platform to the guest operating systems, and may manage the execution of the guest operating systems. Multiple instances of a variety of operating systems may share virtualized hardware resources.

Network 230 includes one or more wired and/or wireless networks. For example, network 230 may include a cellular network (e.g., a fifth generation (5G) network, a long-term evolution (LTE) network, a third generation (3G) network, a code division multiple access (CDMA) network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, and/or the like, and/or a combination of these or other types of networks.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
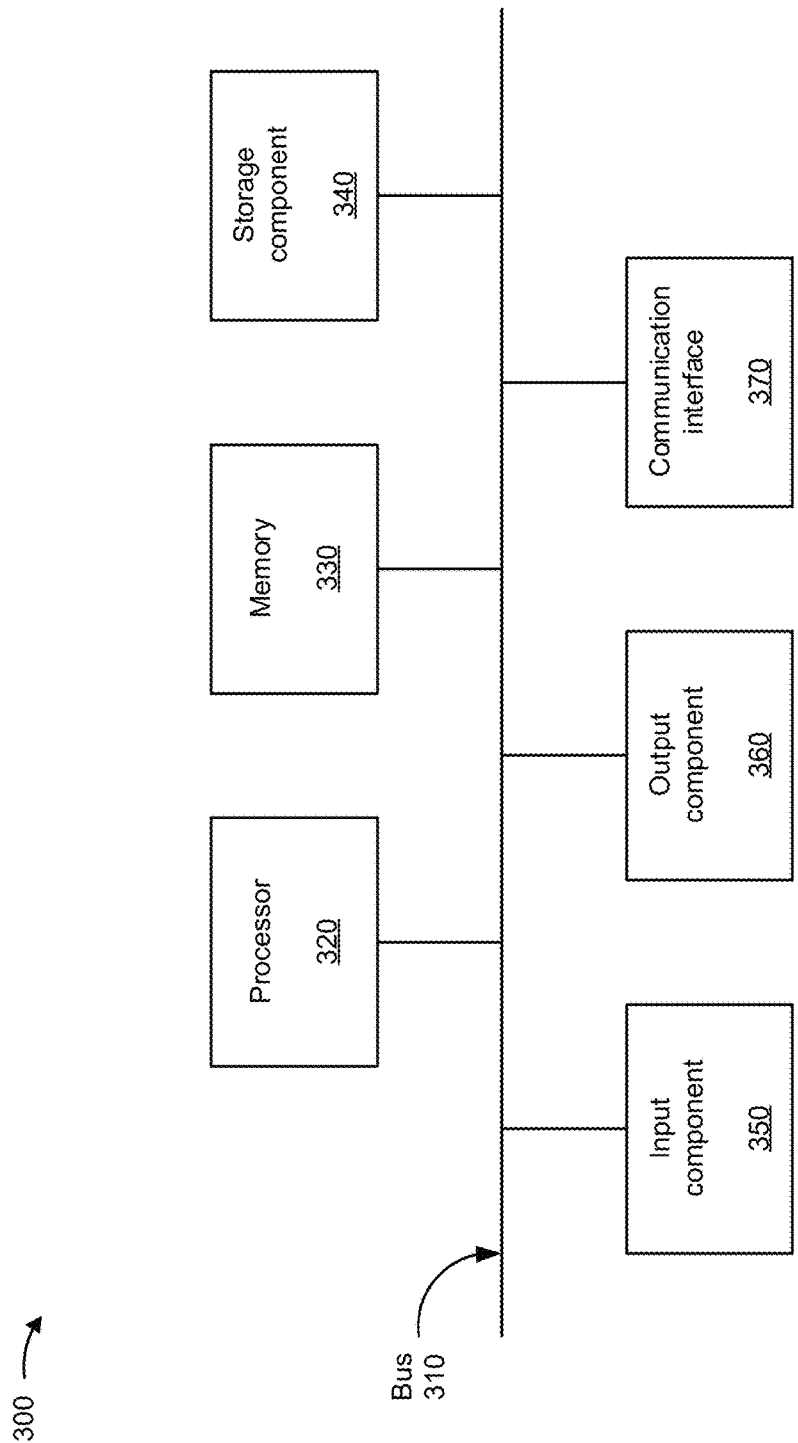
FIG. 3 is a diagram of example components of one or more devices of FIG. 2.

FIG. 3 is a diagram of example components of a device 300. Device 300 may correspond to user device 210, data pruner platform 220, and/or computing resource 224. In some implementations, user device 210, data pruner platform 220, and/or computing resource 224 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 includes a component that permits communication among the components of device 300. Processor 320 is implemented in hardware, firmware, or a combination of hardware and software. Processor 320 is a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 320 includes one or more processors capable of being programmed to perform a function. Memory 330 includes a random access memory (RAM), a read only memory (ROM), and/or another type of dynamic or static storage device (e.g., a flash memory, a magnetic memory, and/or an optical memory) that stores information and/or instructions for use by processor 320.

Storage component 340 stores information and/or software related to the operation and use of device 300. For example, storage component 340 may include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

Input component 350 includes a component that permits device 300 to receive information, such as via user input (e.g., a touch screen display, a keyboard, a keypad, a mouse, a button, a switch, and/or a microphone). Additionally, or alternatively, input component 350 may include a sensor for sensing information (e.g., a global positioning system (GPS) component, an accelerometer, a gyroscope, and/or an actuator). Output component 360 includes a component that provides output information from device 300 (e.g., a display, a speaker, and/or one or more light-emitting diodes (LEDs)).

Communication interface 370 includes a transceiver-like component (e.g., a transceiver and/or a separate receiver and transmitter) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a Wi-Fi interface, a cellular network interface, and/or the like.

Device 300 may perform one or more processes described herein. Device 300 may perform these processes based on processor 320 executing software instructions stored by a non-transitory computer-readable medium, such as memory 330 and/or storage component 340. A computer-readable medium is defined herein as a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

FIG. 4 is a flow chart of an example process 400 for utilizing machine learning to determine data storage pruning parameters. In some implementations, one or more process blocks of FIG. 4 may be performed by a data pruner platform (e.g., data pruner platform 220). In some implementations, one or more process blocks of FIG. 4 may be performed by another device or a group of devices separate from or including data pruner platform 220, such as user device 210.

As shown in FIG. 4, process 400 may include receiving a request to prune a primary database, primary database information, and secondary database information (block 410). For example, the data pruner platform (e.g., using computing resource 224, processor 320, communication interface 370, and/or the like) may receive a request to prune a primary database, primary database information, and secondary database information, as described above in connection with FIGS. 1A-2.

As further shown in FIG. 4, process 400 may include processing the primary database information and the secondary database information, with a machine learning model, to generate suggested pruning parameters (block 420). For example, the data pruner platform (e.g., using computing resource 224, processor 320, memory 330, and/or the like) may process the primary database information and the secondary database information, with a machine learning model, to generate suggested pruning parameters, as described above in connection with FIGS. 1A-2.

As further shown in FIG. 4, process 400 may include providing the suggested pruning parameters to a user device (block 430). For example, the data pruner platform (e.g., using computing resource 224, processor 320, storage component 340, and/or the like) may provide the suggested pruning parameters to a user device, as described above in connection with FIGS. 1A-2.

As further shown in FIG. 4, process 400 may include receiving selected pruning parameters from the user device based on providing the suggested pruning parameters to the user device (block 440). For example, the data pruner platform (e.g., using computing resource 224, processor 320, communication interface 370, and/or the like) may receive selected pruning parameters from the user device based on providing the suggested pruning parameters to the user device, as described above in connection with FIGS. 1A-2.

As further shown in FIG. 4, process 400 may include removing pruned information from the primary database based on the selected pruning parameters (block 450). For example, the data pruner platform (e.g., using computing resource 224, processor 320, memory 330, and/or the like) may remove pruned information from the primary database based on the selected pruning parameters, as described above in connection with FIGS. 1A-2.

As further shown in FIG. 4, process 400 may include providing the pruned information to the secondary database based on the selected pruning parameters (block 460). For example, the data pruner platform (e.g., using computing resource 224, processor 320, memory 330, communication interface 370, and/or the like) may provide the pruned information to the secondary database based on the selected pruning parameters, as described above in connection with FIGS. 1A-2.

As further shown in FIG. 4, process 400 may include providing, to the user device, a result associated with providing the pruned information to the secondary database (block 470). For example, the data pruner platform (e.g., using computing resource 224, processor 320, storage component 340, communication interface 370, and/or the like) may provide, to the user device, a result associated with providing the pruned information to the secondary database, as described above in connection with FIGS. 1A-2.

Process 400 may include additional implementations, such as any single implementation or any combination of implementations described below and/or described with regard to any other process described herein.

In some implementations, the data pruner platform may provide, to the user device, information indicating a result of providing the pruned information to the secondary database. In some implementations, the data pruner platform may determine a problem with the primary database or the secondary database, and may provide, to the user device, an alert associated with the problem. In some implementations, the data pruner platform may receive, from the user device, reconfigured pruning parameters based on providing the alert to the user device, may remove the pruned information from the primary database based on the reconfigured pruning parameters, and may provide the pruned information to the secondary database based on the reconfigured pruning parameters.

In some implementations, the machine learning model may include an exploratory factor analysis model, a confirmatory factor analysis model, a principal component analysis model, a k-means clustering model, and/or a least absolute shrinkage and selection operator (Lasso) regression analysis model. In some implementations, the data pruner platform may perform an analysis of a plurality of secondary databases, and may select the secondary database from the plurality of second databases based on the analysis of the plurality of secondary databases. In some implementations, the data pruner platform may perform an analysis of the primary database information and the secondary database information, may determine a backup strategy for the primary database based on the analysis of the primary database information and the secondary database information, and may implement the backup strategy via the selected pruning parameters.

In some implementations, the pruning parameters may include a pruning frequency parameter, a primary database name parameter, a column to query parameter, and/or a date parameter. In some implementations, the primary database information may include information indicating a cost associated with operation of the primary database, a capacity of the primary database, a quantity of data in the primary database, and/or a type of data in the primary database. In some implementations, the secondary database information includes information indicating a cost associated with operation of the secondary database, a capacity of the secondary database, a quantity of data in the secondary database, and/or a type of data in the secondary database. In some implementations, the model may include one or more machine learning models.

In some implementations, the data pruner platform may receive, from the user device, reconfigured pruning parameters, may remove the pruned information from the primary database based on the reconfigured pruning parameters, and may provide the pruned information to the secondary database based on the reconfigured pruning parameters. In some implementations, the data pruner platform may identify a problem with the primary database or the secondary database, and may provide, to the user device, information indicating the problem.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

Some implementations described herein provide a data pruner platform that utilizes machine learning to determine data storage pruning parameters. For example, the data pruner platform may receive a request to prune a primary database, primary database information associated with the primary database, and secondary database information associated with a secondary database that is different than the primary database. The data pruner platform may process the primary database information and the secondary database information, with a machine learning model, to generate suggested pruning parameters. The data pruner platform may provide the suggested pruning parameters to a user device, and may receive selected pruning parameters from the user device. The data pruner platform may remove pruned information from the primary database based on the selected pruning parameters, and may provide the pruned information to the secondary database based on the selected pruning parameters.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, or a combination of hardware and software.

Certain user interfaces have been described herein and/or shown in the figures. A user interface may include a graphical user interface, a non-graphical user interface, a text-based user interface, or the like. A user interface may provide information for display. In some implementations, a user may interact with the information, such as by providing input via an input component of a device that provides the user interface for display. In some implementations, a user interface may be configurable by a device and/or a user (e.g., a user may change the size of the user interface, information provided via the user interface, a position of information provided via the user interface, etc.). Additionally, or alternatively, a user interface may be pre-configured to a standard configuration, a specific configuration based on a type of device on which the user interface is displayed, and/or a set of configurations based on capabilities and/or specifications associated with a device on which the user interface is displayed.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware may be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A device, comprising:
one or more memories; and
one or more processors, communicatively coupled to the one or more memories, to:
receive, from a user device, a request to prune a primary database;
receive primary database information associated with the primary database,
the primary database information specifying metadata associated with the primary database;
receive secondary database information associated with a secondary database that is different than the primary database,
the secondary database information specifying metadata associated with the secondary database;
process the primary database information and the secondary database information, with a machine learning model, to generate suggested pruning parameters,
the suggested pruning parameters including one or more of:
a pruning frequency parameter,
a primary database name parameter,
a column to query parameter, or
a date parameter;
provide the suggested pruning parameters to the user device;
receive selected pruning parameters from the user device,
the selected pruning parameters being selected from the suggested pruning parameters or being input via the user device;
remove first information from the primary database based on the selected pruning parameters,
the first information including a plurality of database records;
provide the first information to the secondary database based on the selected pruning parameters;
determine, based on a pattern identified from historical access to the first information, a predicted time associated with the first information,
the historical access to the first information including at least one of:
historical access to the first information when the first information was stored in the primary database, or
historical access to the first information when the first information was stored in the secondary database;
remove the first information from the secondary database prior to the predicted time; and
provide the first information to the primary database prior to the predicted time.

2. The device of claim 1, wherein the one or more processors are further to:
provide, to the user device, information indicating a result of providing the first information to the secondary database.

3. The device of claim 1, wherein the one or more processors are further to:
determine a problem with the primary database or the secondary database; and
provide, to the user device, an alert associated with the problem.

4. The device of claim 3, wherein the one or more processors are further to:
receive, from the user device, reconfigured pruning parameters based on providing the alert to the user device;
remove the first information from the primary database based on the reconfigured pruning parameters; and
provide the first information to the secondary database based on the reconfigured pruning parameters.

5. The device of claim 1, wherein the machine learning model includes one or more of:
an exploratory factor analysis model,
a confirmatory factor analysis model,
a principal component analysis model,
a k-means clustering model, or
a least absolute shrinkage and selection operator (Lasso) regression analysis model.

6. The device of claim 1, wherein the one or more processors are further to:
perform an analysis of a plurality of secondary databases; and
select the secondary database from the plurality of secondary databases based on the analysis of the plurality of secondary databases.

7. The device of claim 1, wherein the one or more processors are further to:
perform an analysis of the primary database information and the secondary database information;
determine a backup strategy for the primary database based on the analysis of the primary database information and the secondary database information; and
implement the backup strategy via the selected pruning parameters.

8. A non-transitory computer-readable medium storing instructions, the instructions comprising:
one or more instructions that, when executed by one or more processors, cause the one or more processors to:
receive, from a user device, a request to prune a primary database;
receive primary database information associated with the primary database,
the primary database information specifying metadata associated with the primary database;
perform an analysis of a plurality of secondary databases;
select a secondary database from the plurality of secondary databases based on the analysis of the plurality of secondary databases;
receive secondary database information associated with the secondary database,
the secondary database information specifying metadata associated with the secondary database;

process the primary database information and the secondary database information, with a model, to generate pruning parameters,
  the pruning parameters including one or more of:
    a pruning frequency parameter,
    a primary database name parameter,
    a column to query parameter, or
    a date parameter;
automatically implement the pruning parameters;
remove first information from the primary database based on automatically implementing the pruning parameters,
  the first information including a plurality of database records;
provide the first information to the secondary database based on automatically implementing the pruning parameters;
determine, based on a pattern identified from historical access to the first information, a predicted time associated with the first information;
  the historical access to the first information including at least one of:
    historical access to the first information when the first information was stored in the primary database, or
    historical access to the first information when the first information was stored in the secondary database;
remove the first information from the secondary database prior to the predicted time; and
provide the first information to the primary database prior to the predicted time.

9. The non-transitory computer-readable medium of claim 8, wherein the primary database information includes information indicating one or more of:
  a cost associated with operation of the primary database,
  a capacity of the primary database,
  a quantity of data in the primary database, or
  a type of data in the primary database.

10. The non-transitory computer-readable medium of claim 8, wherein the secondary database information includes information indicating one or more of:
  a cost associated with operation of the secondary database,
  a capacity of the secondary database,
  a quantity of data in the secondary database, or
  a type of data in the secondary database.

11. The non-transitory computer-readable medium of claim 8, wherein the instructions further comprise:
  one or more instructions that, when executed by the one or more processors, cause the one or more processors to:
    provide, to the user device, information indicating a result of providing the first information to the secondary database.

12. The non-transitory computer-readable medium of claim 8, wherein the instructions further comprise:
  one or more instructions that, when executed by the one or more processors, cause the one or more processors to:
    determine a problem with the primary database or the secondary database;
    provide, to the user device, an alert associated with the problem;
    receive, from the user device, reconfigured pruning parameters based on providing the alert to the user device;
    remove the first information from the primary database based on the reconfigured pruning parameters; and
    provide the first information to the secondary database based on the reconfigured pruning parameters.

13. The non-transitory computer-readable medium of claim 8, wherein the model includes one or more machine learning models.

14. A method, comprising:
receiving, by a device and from a user device, a request to prune a primary database;
receiving, by the device, primary database information associated with the primary database,
  the primary database information specifying metadata associated with the primary database;
performing, by the device, an analysis of a plurality of secondary databases;
selecting, by the device, a secondary database from the plurality of secondary databases based on the analysis of the plurality of secondary databases;
receiving, by the device, secondary database information associated with the secondary database,
  the secondary database information specifying metadata associated with the secondary database;
processing, by the device, the primary database information and the secondary database information, with a model, to generate suggested pruning parameters,
  the suggested pruning parameters including one or more of:
    a pruning frequency parameter,
    a primary database name parameter,
    a column to query parameter, or
    a date parameter;
providing, by the device, the suggested pruning parameters to the user device;
receiving, by the device, selected pruning parameters from the user device,
  the selected pruning parameters being selected from the suggested pruning parameters or being input via the user device;
removing, by the device, pruned first information from the primary database based on the selected pruning parameters,
  the first information including a plurality of database records;
providing, by the device, the first information to the secondary database based on the selected pruning parameters;
determining, by the device and based on a pattern identified from historical access to the first information, a predicted time associated with the first information,
  the historical access to the first information including at least one of:
    historical access to the first information when the first information was stored in the primary database, or
    historical access to the first information when the first information was stored in the secondary database;
removing, by the device, the first information from the secondary database prior to the predicted time; and
providing, by the device, the first information to the primary database prior to the predicted time.

15. The method of claim 14, further comprising:
performing an analysis of the primary database information and the secondary database information;

determining a backup strategy for the primary database based on the analysis of the primary database information and the secondary database information; and implementing the backup strategy via the selected pruning parameters.

16. The method of claim 14, further comprising:

providing, to the user device, information indicating a result of providing the first information to the secondary database.

17. The method of claim 14, further comprising:

receiving, from the user device, reconfigured pruning parameters;

removing the first information from the primary database based on the reconfigured pruning parameters; and providing the first information to the secondary database based on the reconfigured pruning parameters.

18. The method of claim 14, further comprising:

identifying a problem with the primary database or the secondary database; and providing, to the user device, information indicating the problem.

19. The method of claim 14, wherein the model includes one or more machine learning models, and the one or more machine learning models include one or more of:

an exploratory factor analysis model, a confirmatory factor analysis model, a principal component analysis model, a k-means clustering model, or a least absolute shrinkage and selection operator (Lasso) regression analysis model.

20. The method of claim 14, wherein the primary database information includes information indicating one or more of:

a cost associated with operation of the primary database, a capacity of the primary database, a quantity of data in the primary database, or a type of data in the primary database.

\* \* \* \* \*